Patented June 6, 1950

2,510,089

UNITED STATES PATENT OFFICE 2,510,089

METHOD OF DRYING ALLYL STARCH

Thomas J. Dietz, Philadelphia, and John E. Hansen, North Wales, Pa., assignors to the United States of America as represented by the Secretary of Agriculture No Drawing. Application June 21, 1949,
Serial No. 100,522

2 Claims. (Cl. 260—233.3)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the manufacture of allyl starch and more particularly to a method for recovering substantially pure, anhydrous allyl starch.

Solvent-soluble allyl ethers of starch are usually prepared by reacting an aqueous suspension of starch with an allyl halide in the presence of concentrated alkali. If a relatively low-boiling halide, such as allyl chloride, is used as the allylating agent, the reaction is conducted under superatmospheric pressure at about 80° C. To facilitate dispersion of the reactants and to dissolve allyl starch, polar organic solvents such as lower ketones may be added to the reaction mixture. It is customary to recover the allyl starch by precipitation with water. The viscous, semisolid precipitate thus obtained contains inorganic salts and various by-products of the reaction. A steam-distillation step completes the precipitation of allyl starch and assists in driving off the volatile solvents. The precipitate is then washed with water in an internal mixer, to remove the water-soluble impurities. The washed allyl starch is dough-like in appearance and consistency, containing about 20–30 percent water, which must be removed before the allyl starch can be dissolved in common organic solvents such as aromatic hydrocarbons.

Washing the crude allyl starch precipitate is a tedious and time-consuming procedure, in that it must be continued until all the water-soluble and water-dispersible impurities have been removed. Since on prolonged storage in contact with air, dry allyl starch is gradually converted into an insoluble product, it is usually marketed in the form of concentrated solutions. Such solutions are apt to be cloudy unless all the organic solvent-insoluble impurities have been removed from the initial reaction product during the washing process. Removal of insolubles by filtration of the viscous, highly concentrated solutions, involves practically insuperable difficulties. Drying of allyl starch either under vacuum or in the air induces incipient polymerization, which is promoted by an increase of either the temperature or the duration of the drying process. Although the dry material obtained is readily dissolved in organic solvents the concentrated solutions of allyl starch that have undergone a considerable degree of incipient polymerization in the course of drying, are likely to gel within a relatively short time and are thereafter no longer suitable for further utilization.

An object of this invention, therefore, is to provide a method for recovering substantially pure allyl starch by procedures that are simpler and more efficacious than those used hitherto. Another object is to provide means for removing organic solvent-insoluble constituents of crude allyl starch without resorting to washing with water. A further object of the invention is the provision of a method for drying allyl starch under conditions which mitigate the tendency of allyl starch to undergo incipient polymerization. Other objects and advantages will be apparent from the following description of the invention.

We have found that substantially complete separation of salts and other organic solvent-insoluble impurities present in crude allyl starch can be effected by dispersing the crude aqueous product in a mixture of low-boiling organic solvents, adapted to dissolve allyl starch, said mixture comprising a water-soluble solvent and a water-immiscible solvent combined in such proportions as to cause separation of the water present in the crude allyl starch from the resulting solution of allyl starch in the organic solvent medium. We have further found that allyl starch can be recovered in a substantially pure anhydrous state, on evaporation, preferably by spray-drying, of the organic solvent solution thus obtained.

The low-boiling organic solvents adapted for use in our process are solvents capable of dissolving allyl starch and having a boiling point below 100° C. Suitable water-soluble organic solvents are preferably those which are miscible with water in any proportion or at least soluble in water to an extent of about 30 percent by weight at ordinary temperature. Such water-soluble solvents include lower aliphatic ketones and alcohols, like acetone, methyl-ethyl ketone, methyl-ethyl, propyl, isopropyl, and tertiary-butyl alcohol. Suitable water-immiscible solvents are those having a solubility of less than about one percent such as, for example, benzene.

According to the method of this invention the aqueous reaction mixture obtained on allylation of starch, by known procedures, combined with an amount of a low-boiling, water-soluble organic solvent, sufficient to dissolve the allyl starch, is neutralized and is then blended with a water-immiscible solvent until the mixture separates into two liquid phases, and the volume of the aqueous phase ceases to increase to any appreciable extent on further addition of the water-immiscible solvent. The aqueous phase is then separated either by stratification or by means of centrifugation. The organic solvent solution thus obtained, may be further purified by sedimentation or filtration and is then spray-dried in a conventional manner to recover the allyl starch.

The following example illustrates the invention:

A batch of crude allyl starch was prepared using the following recipe:

| | | |
|---|---|---:|
| Starch, air dried | g | 1165 |
| Allyl chloride | ml | 1400 |
| Sodium hydroxide | g | 653 |
| Water | g | 653 |
| Sodium iodide | g | 24 |
| Acetone | ml | 4000 |

The reaction was carried out at 90° C. for about 10 hours.

At the end of this time 60 ml. of concentrated hydrochloric acid was added and the reaction continued for another 30 minutes. The mixture was then allowed to cool and stand overnight. The following morning 25 ml. of concentrated hydrochloric acid was added. The mixture was then heated to 90° C., held at this temperature for 15 minutes and then allowed to cool at room temperature. When the mixture had cooled, it was neutralized by addition of 40 ml. of ammonium hydroxide. The resulting mixture of allyl starch and minor side reaction products dissolved in aqueous acetone, containing excess water, allyl alcohol, inorganic salts and unknown minor constituents was combined with 3 liters of benzene (ratio of benzene to acetone, 3:4) and allowed to stand at room temperature for approximately one week, to permit settling of the salts and water phase. (The same result can be accomplished in a short time by centrifugal separation.) A sample of the supernatant layer, which was clear and amber in color, was siphoned off and transferred to the suction feed cup of a standard spray gun. Air pressure on the gun was adjusted to 60 p. s. i. and the test sample was sprayed into a large cheesecloth bag placed in the wind stream of an ordinary spray booth. Wind velocity was about 100 linear feet per minute. The cheesecloth bag quickly became charged with the solid material from the test sample and as spraying was continued a layer of light fluffy powder was built up on the cheesecloth.

A sample of this powder was analyzed, and found to consist of dry allyl starch of comparable purity to that obtained by conventional recovery and drying methods. The dry allyl starch so obtained was an off-white amorphous powder, readily soluble in suitable solvents, such as a mixture containing 13 parts xylene, 1 part n-butanol, 1 part ethanol and 2 parts monobutyl ether of ethylene glycol. A 35 percent solution of spray-dried allyl starch in 50:50 toluene and n-butanol had a color of #10 on the Gardner Scale, a viscosity of 0.5–1.3 poises and was brilliantly clear.

The recovery and drying method of this invention possesses several advantages over the prior art. It eliminates the necessity for the steam distillation step normally required for the removal of the organic solvents. In addition, the subsequent water-washing step to remove water-soluble constituents, such as salts and starch fractions of low substitution, is no longer required. Furthermore, the centrifugal clarification step prior to spray drying makes it unnecessary to clarify the prepared lacquer.

Having thus described our invention we claim:

1. The method of segregating organic solvent-soluble allyl starch from the mixture of reaction products formed on interaction of starch with an allyl halide in the presence of concentrated aqueous alkali hydroxide, which comprises: combining said mixture with a sufficient amount of a low-boiling, water-soluble, allyl starch solvent, having a boiling point below 100° C., to dissolve the allyl starch; neutralizing the resulting solution; adding a low-boiling, water-immiscible allyl starch solvent, in amount sufficient to cause substantially complete separation of the water present in said solution; separating the resulting organic solvent phase from the aqueous phase and solid, insoluble material, and spray drying the organic solvent solution thus obtained to recover the allyl starch.

2. The process in accordance with the method defined in claim 1, wherein the water-soluble allyl starch solvent is acetone and the water-immiscible solvent is benzene, and wherein the separation of the aqueous phase is effected by adding an amount of benzene sufficient to bring the volume ratio of benzene acetone to at least 3 to 4.

THOMAS J. DIETZ.
JOHN E. HANSEN.

No references cited.